United States Patent
Shay

(10) Patent No.: US 11,704,356 B2
(45) Date of Patent: Jul. 18, 2023

(54) RESTORING INTEGRITY OF A SOCIAL MEDIA THREAD FROM A SOCIAL NETWORK EXPORT

(71) Applicant: DROPBOX, INC., San Francisco, CA (US)

(72) Inventor: Kyle Shay, Oakland, CA (US)

(73) Assignee: Dropbox, Inc., San Francisco, CA (US)

( * ) Notice: Subject to any disclaimer, the term of this patent is extended or adjusted under 35 U.S.C. 154(b) by 766 days.

(21) Appl. No.: 16/563,453

(22) Filed: Sep. 6, 2019

(65) Prior Publication Data
US 2021/0073268 A1    Mar. 11, 2021

(51) Int. Cl.
*G06F 16/538*   (2019.01)
*G06F 16/535*   (2019.01)
*G06F 16/958*   (2019.01)
*G06F 16/58*    (2019.01)
*H04L 51/52*    (2022.01)
*H04L 51/216*   (2022.01)

(52) U.S. Cl.
CPC .......... *G06F 16/538* (2019.01); *G06F 16/535* (2019.01); *G06F 16/5866* (2019.01); *G06F 16/972* (2019.01); *H04L 51/216* (2022.05); *H04L 51/52* (2022.05)

(58) Field of Classification Search
None
See application file for complete search history.

(56) References Cited

U.S. PATENT DOCUMENTS

| | | | |
|---|---|---|---|
| 6,604,144 B1 * | 8/2003 | Anders | H04L 29/06 709/231 |
| 7,818,392 B1 * | 10/2010 | Martino | H04L 51/32 709/200 |
| 9,063,814 B2 * | 6/2015 | Lam | G06F 8/63 |
| 9,916,329 B2 | 3/2018 | Lindsay | |
| 2006/0177114 A1 * | 8/2006 | Tongdee | G06F 16/58 382/128 |
| 2008/0148366 A1 * | 6/2008 | Wahl | G06F 21/36 726/4 |
| 2008/0288506 A1 * | 11/2008 | Brown | G06F 16/188 |
| 2009/0052804 A1 * | 2/2009 | Lewis | G06F 16/93 382/298 |
| 2011/0191395 A1 * | 8/2011 | Tumati | G06F 16/00 707/822 |

(Continued)

OTHER PUBLICATIONS

Olin, "Social meta data: How to set up your site for social sharing success", retrieved from https://www.flint-group.com/blog/social-meta-data-sharing-success, Apr. 2016, 12 pages.

(Continued)

*Primary Examiner* — Thu N Nguyen
(74) *Attorney, Agent, or Firm* — Polsinelli PC

(57) ABSTRACT

The disclosed technology addresses the need in the art for a service that can ingest a social network export and restore the integrity of threads within the social network export. The present technology can unite images in the social network export with the caption from the initial post, and with any comments within the thread. Likewise, images in the social network export can be enhanced to include metadata that reflects when the image was posted and any other contextual information that the social network provides in export file.

20 Claims, 6 Drawing Sheets

(56) References Cited

U.S. PATENT DOCUMENTS

| | | | |
|---|---|---|---|
| 2015/0074165 A1* | 3/2015 | Rahardja | G06F 21/606 709/201 |
| 2015/0186420 A1* | 7/2015 | Yan | G06F 3/04842 707/736 |
| 2018/0004776 A1 | 1/2018 | Heyward et al. | |
| 2018/0107660 A1 | 4/2018 | Wang et al. | |
| 2018/0350009 A1 | 12/2018 | Haugen et al. | |

OTHER PUBLICATIONS

LMW, "What is Metadata and how to customize it for Social Media", retrieved from https://my.lwv.org/mylo/what-metadata-and-how-customize-it-social-media, Jun. 2018.

* cited by examiner

```
{ "status_updates": [
    {
        "timestamp": 1542674486,
        "attachments": [
            {
                "data": [
                    {
                      "media": {
                      "uri":"photos_and_videos/your_posts/46469236.jpg",          — 202
                         "creation_timestamp": 1542672226,
                         "media_metadata": {
                            "photo_metadata": {
                               "upload_ip": "200.0.0.1"
                            }
                         }
                      },
                      "comments": [
                        {                                                          — 204
                          "timestamp": 1542680356,
                          "comment": "I've seen an enchanted Rose like that before",
                          "author": "Belle",
                        }
                      ],
                      "description": The Rose"
                    }
                 }
              ]
           }
        ],
        "data": [                                              — 206
           {
              "post": "The Rose"
           }
        ],
        "title": "Roland Deschain posted"
      }
   ]
}
```

FIG. 2A

RESTORING INTEGRITY OF A SOCIAL MEDIA THREAD FROM A SOCIAL NETWORK EXPORT

TECHNICAL FIELD

The present technology pertains to archiving an export from a social network, and more specifically pertains to uniting social media data that were associated with an image in a thread on a social network with the image after the social media comments and the image were separated during export from the social network.

BACKGROUND

Prompted by recent regulations, service providers are required to give customers access to their data. Therefore, social network providers have created user data export tools to allow users to download their social media data. However, the export files are not particularly useful to most users. The social media exports of user data typically consists of an archive of images and a json or xml formatted export file listing data associated with each thread associated with the user account. To most users the export file looks like software code with data mixed in, and unless the user understands the syntax, the file is mostly unusable.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 2A and FIG. 2B provide example data exported from a social network;

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for a service that can ingest a social network export and restore the integrity of threads within the social network export.

Typical export files from social networks are not particularly useful to most users. The social media exports of user data typically consist of an archive of images and a json or xml formatted export file listing data associated with each thread associated with the user account. To most users, the export file looks like software code with data mixed in, and unless the user understands the syntax, the file is mostly unusable. Additionally, the images typically include no metadata showing when they were posted, or by whom. The images themselves do not include any reference to data from the threads they were originally posted with.

The present technology can unite images in the social network export with the caption from the initial post, and with any comments within the thread. Likewise, images in the social network export can be enhanced to include metadata that reflects when the image was posted and any other contextual information that the social network provides in export file.

In some embodiments, the present technology can display threads from social networks in a manner that is more consistent with their original appearance in the social network.

In some embodiments, a social media archive can process, store, and index social network exports and make threads easy to find and navigate.

Each of these features will make social network export data more usable to users and give users more control over their data.

Figure 1:
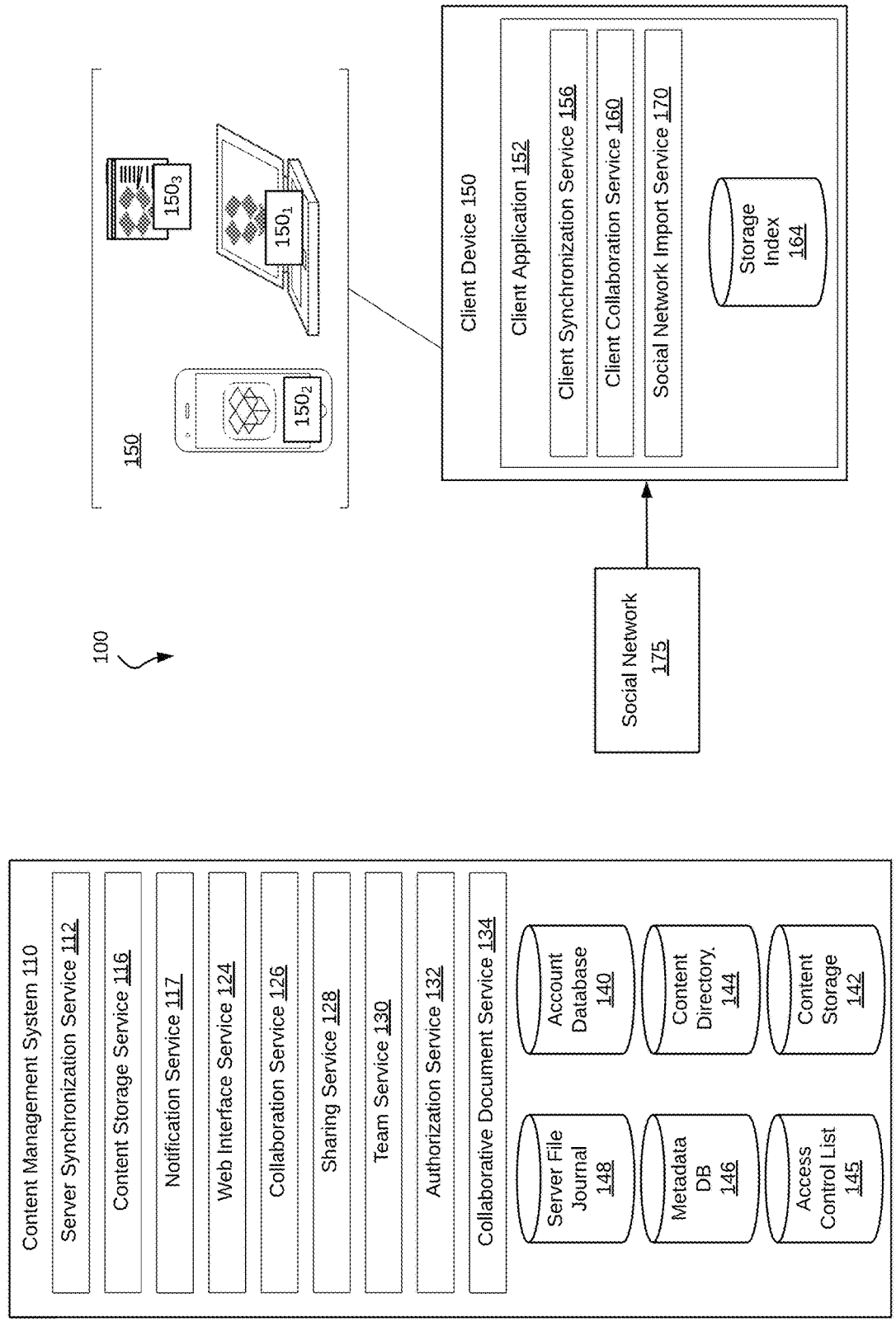
FIG. 1 shows an example of a content management system and client devices in accordance with some aspects of the present technology.

In some embodiments, the disclosed technology is deployed in the context of a content management system having content item synchronization capabilities and collaboration features, among others. An example system configuration 100 is shown in FIG. 1, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content storage service 116 can output a unique ID for each content item.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments, the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content storage service 116 can also store metadata describing content items, content item types, folders, file path, and/or the relationship of content items to various accounts, collections, or groups in metadata database 146, in association with the unique ID of the content item.

Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110.

Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

When synchronizing from content management system 110 to client device 150, a mount, modification, addition, deletion, move of a content item recorded in server file journal 148 can trigger a notification to be sent to client device 150 using notification service 117. When client device 150 is informed of the change a request changes listed in server file journal 148 since the last synchronization point known to the client device. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments, a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments, content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146.

Collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc.

Collaboration service 126 can provide a messaging platform whereby users can send and receive instant messages, voice calls, emails, etc.

Collaboration Content Items

In some embodiments, content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a web interface and there they can work on the same copy of the content item at the same time.

Collaboration Companion Interface

In some embodiments, client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

FIG. 1 also illustrates social network 175 that can export user data that can be received by client device 150 and stored in a location that is under management of client application 152. While not shown, in some embodiments, social network 175 can be configured to export user data directly into a user account at content management system 110.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

As introduced above, social network 175 can export user data. However, that data is not in a user friendly or useful format. FIG. 2A illustrates an example export file containing data for just one thread. The export file contains data in a programming language called JSON (JavaScript Object Notation) which makes understanding the contents of the file difficult for an ordinary user that does not have the skills necessary to read such files.

While FIG. 2A shows an example of an export file that contains just one thread, a typical export file can contain many threads, which makes the export file even more challenging to understand.

Further, the export file in FIG. 2A is an example of an export file from just one social network, however, each social network can arrange their export files differently. Even social networks provided by the same parent company provide export files that are arranged differently (e.g., FACEBOOK and INSTAGRAM provide different arrangements for their export files even though they are both owned by FACEBOOK).

In many instances, threads on social media are accompanied by an image, and the export file can provide reference 202 to the location of the image, and provides a location in which the image can be found in the export of user data. The images associated with the export can be stored in a zip directory that accompanies the export file. In addition, the thread for which data is reflected in FIG. 2A includes a caption 206 for the image (it is the original posted comment that accompanied the image) and comments 204 that one or more users may have posted in reply to the post. Collectively all of this content can make up a thread on social media.

As noted above, the image associated with the thread can be found in a directory of images associated with the thread represented in the export file. However, these images are just files in a directory without any helpful metadata. For example, there is nothing in the image file that identifies the post or thread in which the image was included. The image file might not even include the date the image was posted or a location in which the image was taken as is common with images taken with most digital cameras.

Figure 2B:
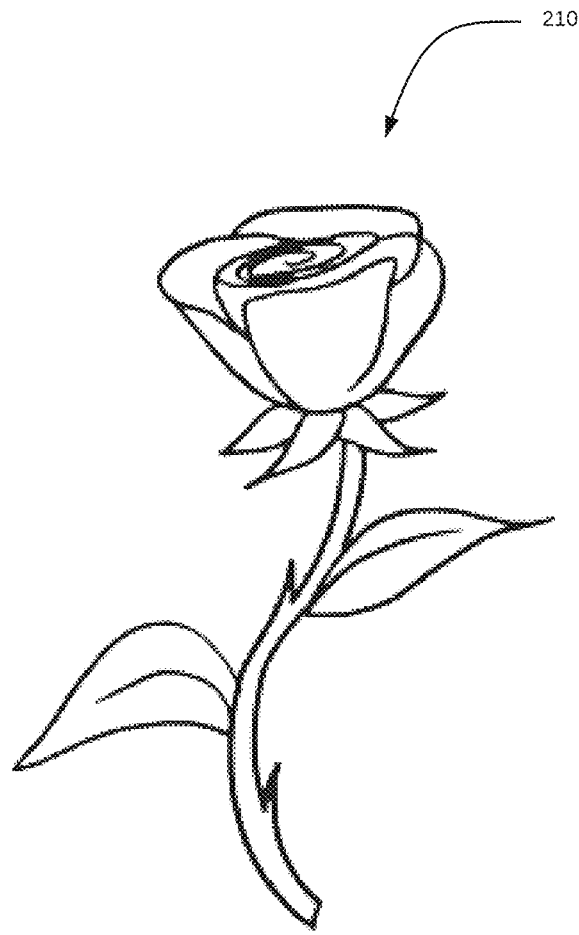

FIG. 2B illustrates image 210 corresponding to the image file referenced 202 in FIG. 2A. As illustrated, there is no helpful information displayed when the image is opened and presented as in FIG. 2B.

Figure 3:
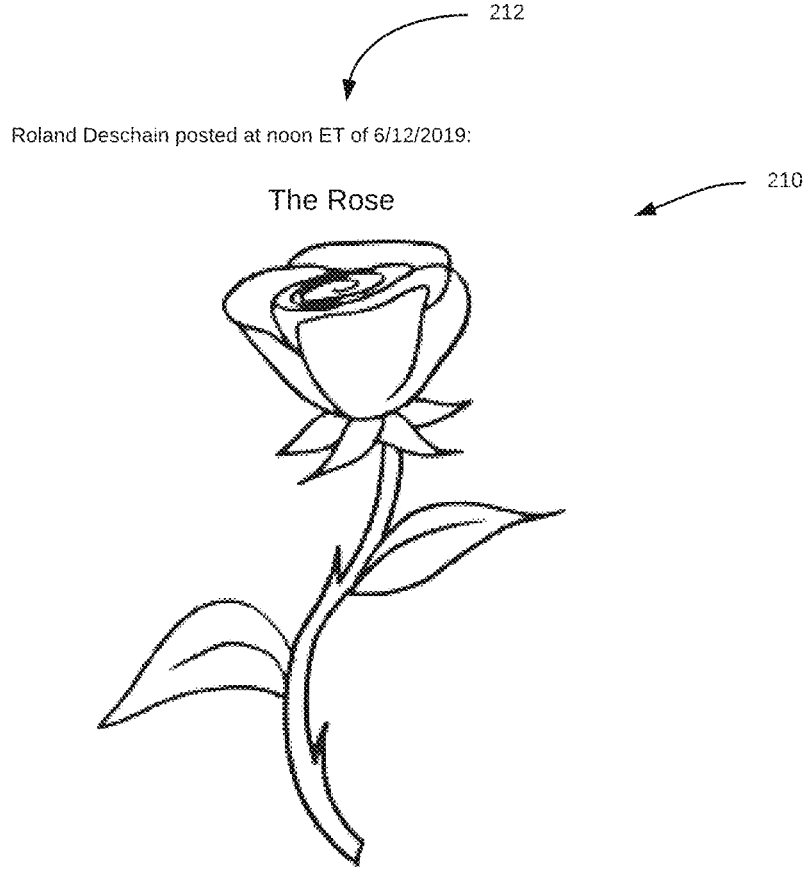
FIG. 3 is an example image with data previously associated with the image in a social network in accordance with some aspects of the present technology.

However, after the present technology has processed the export file and images associated with the export of user data from the social network, the result is shown in FIG. 3. In FIG. 3, image 210 has been enhanced with metadata that can be presented when the image file is selected and opened. As seen in FIG. 3, caption information and information relevant to the original post 212 is displayed along with image 210 and any additional comments 214 that are part of the thread. All of this information was extracted from the export file and embedded as metadata in the image file so that the elements of the thread can be associated with the image file such that whenever the image file is opened, the full context of the thread in which it was shared is available and presented.

Figure 4:
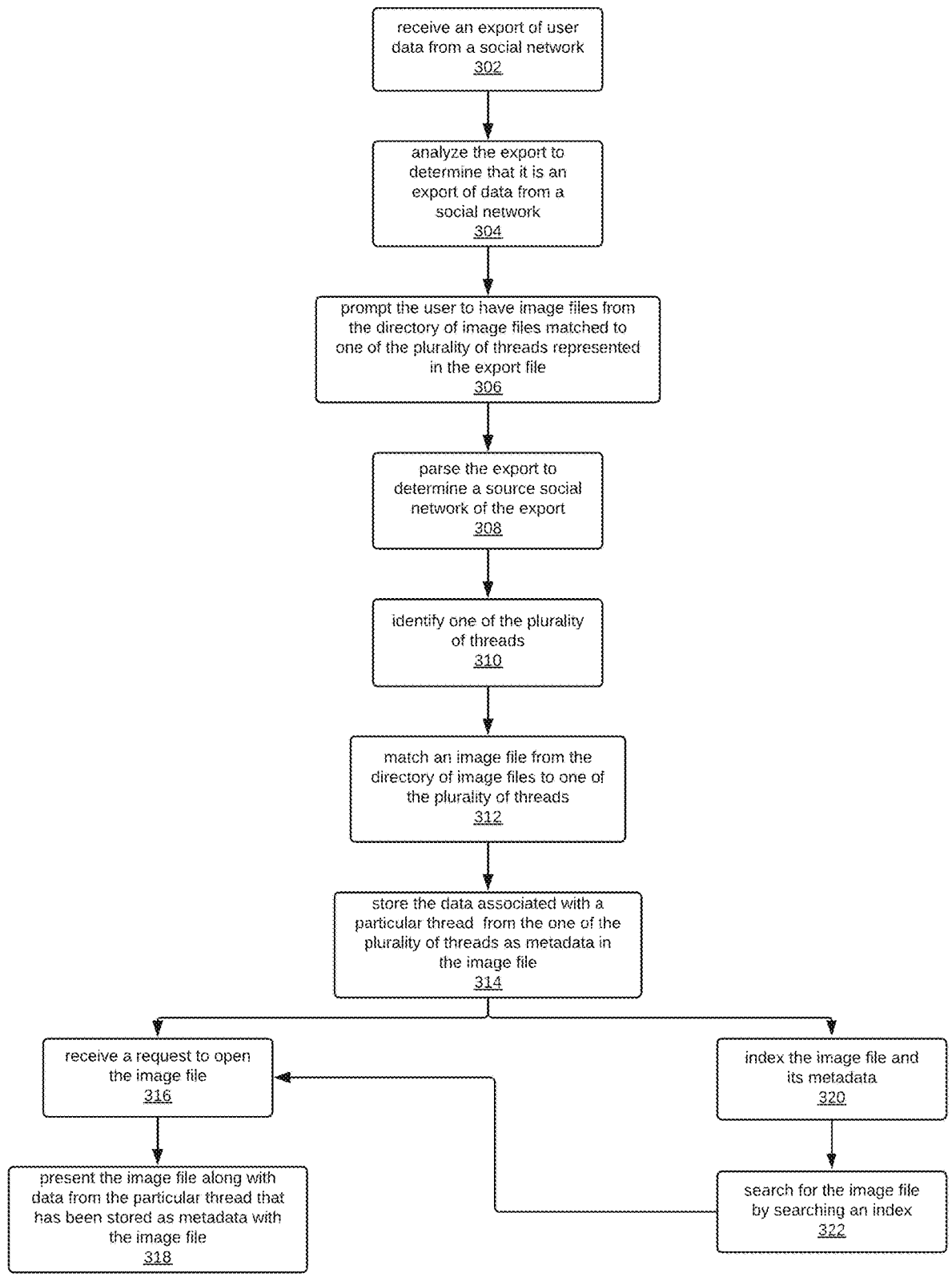
FIG. 4 is an example method embodiment in accordance with some aspects of the present technology.

FIG. 4 illustrates an example method in accordance with some embodiments of the present technology. A user can interact with a social network to request an export of user data from the social network, and once it is prepared the user can download the export of user data from the social network. The export can consist of a directory of images and an export file that organizes the user data according to the threads that originated the data on the social network.

Once the user has downloaded the export of user data from the social network, the user can store the export of user data in a directory that can be accessed by client application 152. Social network import service 170 can receive (302) the export of user data from the social network either by automatically determining (304) that the data in the directory is an export of user data from a social network, or in response to a request to an explicit instruction by a user to analyze the export of user data from the social network. When social network import service 170 automatically determines (304) that the data in the directory is an export of user data from a social network, social network import service 170 can prompt (306) the user that social network import service 170 may be able to restore the integrity of the social media posts in order to make the data more accessible and usable by matching image files from the directory of image files to one of the plurality of threads represented in the export file.

Social network import service 170 can begin to parse (308) the export file to first determine a source social network of the export. As noted above each social network may arrange the data in their export file differently. As such social network import service 170 needs to know the source the social network that provided export file. In some embodiments, a user can inform social network import service 170 of the source social network. In some embodiments, social network import service 170 can automatically determine the source social network by recognizing an arrangement of fields in the export file.

Once social network import service 170 has determined a source social network of the export, social network import service 170 can analyze the export file according to rules specific to the particular source social network and can identify (310) one of the plurality of threads within the export file. As illustrated with respect to FIG. 2A the export file can reference in image file. Social network import service 170 can match (312) the image file referenced in the export file to the thread in which the image file was posted.

Social network import service 170 can then store (314) the data associated with the particular thread from one of the threads in the export file as metadata in the image file. In some embodiments, social network import service 170 can store (314) the image file in metadata in a directory of social network threads that includes threads from multiple different social networks.

Once the image file has been enhanced with metadata from the thread in the export file, the image file is now a useful file to the user. In some embodiments, client application 152 can index (320) the image file and its metadata making it available for the user to search (322) the image file by searching the index.

Whether the user searches for the image file or browses the directory containing the image file, client application 152 can receive a request (316) to open an image file, and client application 152 can present (318) the image file along with data from the particular thread that has been stored as metadata within the image file as illustrated in FIG. 3. In some embodiments, client application 152 can present (318) the image file and other data from the thread in a format that is similar to the source social network by mimicking certain aspects of the known look and feel of a particular social network including a background and format that replicates the appearance of the image and thread presented by the source social network.

While the method discussed with respect to FIG. 4 was explained with reference to the method being performed on client device 150, it should be appreciated that the method could also be performed by content management system 110. In some embodiments, social network import service 170 can be a service on content management system 110. Therefore the steps discussed with respect to FIG. 4 can be performed by content management system 110. In some embodiments, content management system 110 can receive social network export file directly from social network 175, while in other embodiments content management system 110 can receive social network export file from client device 150 through client synchronization service 156.

Using the present technology, content management system 110 can become a source for archiving threads from a variety of different social media networks. The user can request exports from any social network in which the user has an account in the present technology, and content management system 110 can process the exports and create a directory of threads. In some embodiments, the exports from social networks can be automated by content management system 110 utilizing APIs to social networks and account credentials provided by the user to regularly request exports from social networks.

Since current social network exports include all user data, social network import service 170 can include a mechanism for recognizing previously processed threads so as to not create duplicates.

The present technology has focused on matching images to the threads in which they originally occurred. In some embodiments, social network import service 170 can also create individual files for each thread in the social media export file to make browsing for and identifying a particular thread more intuitive to a user.

In embodiments wherein content management system 110 becomes an archive for exported social media, content management system 110 may provide a service for interacting with threads that can include occasionally surfacing threads to a user to remind them of past memories. Content management system may also allow for continued commenting on the thread when a particular thread is shared through content management system. In some embodiments, content management system 110 can differentiate comments that were made on a social media platform from new comments made after the thread had become stored at content management system 110.

In some embodiments, content management system 110 can become a collection point for multiple different accounts associated with the same user. For example if the user is a company with many locations where each location has its own social media presence, content management system 110 can receive exports from each locations' own social media presence and can aggregate them all in the same account. When all threads from all locations are present in the same account this can enable content management system to run analytics on those that are similar and different and to identify posts and characteristics of those posts that are most likely to receive engagement from users following the brand on the social network.

In some embodiments, content management system can also analyze archive posts to determine other users that interact frequently with the user of content management system 110 on social media. This information could be useful to content management system 110 to recommend sharing of other content stored by content management system 110 with the users in which the user account interacts frequently on social media.

In some embodiments, content management system 110 can also provide data mobility to social network data. Content management system 110 can receive exports from a social network and process the data as described herein. Thereafter, content management system 110 may also be able to upload archived social media data into a different social media service, thereby making it possible for a user to bring their social media history with them when they switch services.

Figure 5:
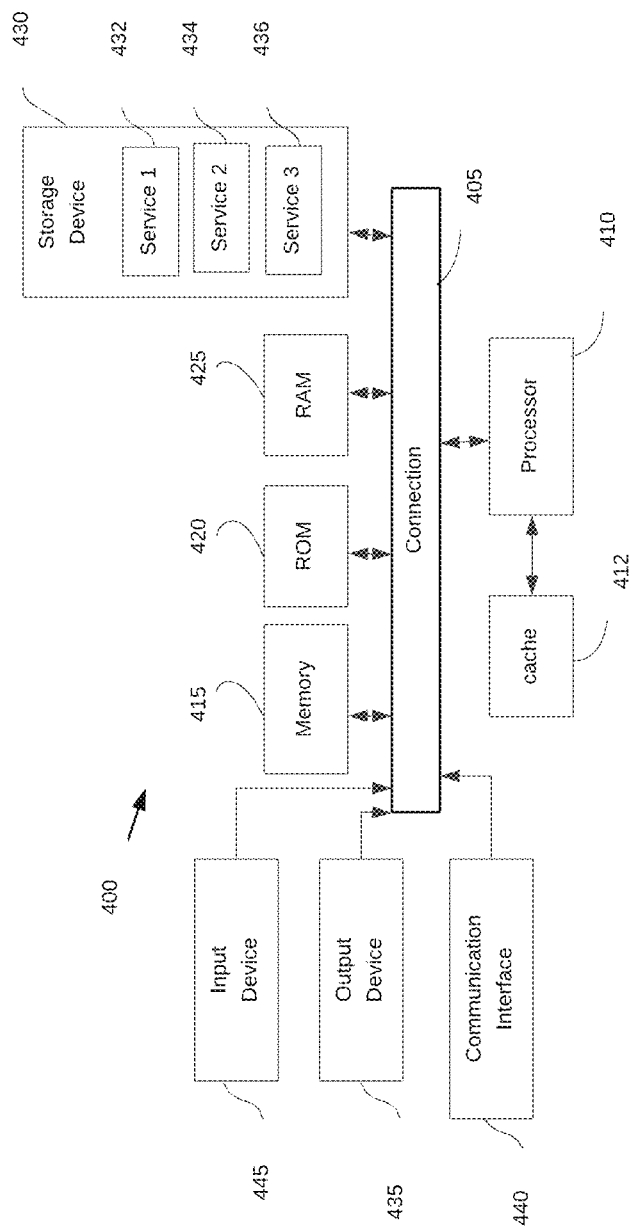
FIG. 5 shows an example of a system for implementing certain aspects of the present technology.

FIG. 5 shows an example of computing system 400, which can be for example any computing device making up client device 150, content management system 110 or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:
receiving, by a social network import service, an export file of user data from a social network, the export file comprising a directory of images and a plurality of comments on the social network;
analyzing, at the social network import service, the export file to determine that the export file includes data from the social network;
prompting a user with a question about whether the user would like an image file from the directory of the images matched to a comment of the plurality of comments represented in the export file;
in response to a received response to the prompt, matching the image file from the directory of the images to the data associated with at least one comment in the user data; and
storing the data associated with the at least one comment as metadata in the image file.

2. The method of claim 1, comprising:
parsing the export file including the user data associated with the plurality of comments to determine a source social network of the export; and
based on the source social network of the export identify the one of the plurality of comments.

3. The method of claim 2, wherein different source social networks are each associated with a different format for the export of the user data associated with a plurality of threads, wherein the threads on the source social network related the at least one comment with the image file.

4. The method of claim 1, comprising:
receiving a request to open the image file after the data associated with the at least one comment has been stored as the metadata with the image file; and
presenting the image file along with the data from the at least one comment that has been stored as the metadata with the image file.

5. The method of claim 4, wherein the presenting the image file further includes presenting the image file with a background and formatting that replicates an appearance of the image file and the at least one comment when presented by the social network.

6. The method of claim 1, comprising:
after storing the data associated with the at least one comment as the metadata in the image file, indexing the image file and the metadata of the image file in an index.

7. The method of claim 6, comprising:
searching for the image file by searching the index.

8. The method of claim 1, comprising:
adding the image file along with the metadata of the image file to an archive directory of social network comments that includes comments from multiple social networks.

9. At least one non-transitory computer readable medium comprising instructions stored thereon that when executed cause at least one processor to:
receive, by a social network import service, an export file of user data from a social network, the export comprising a directory of images and a plurality of comments on the social network;
analyze, at the social network import service, the export file to determine that it includes data from the social network;
prompt a user with a question about whether the user would like the image file from the directory of the images matched to a comment of the plurality of comments represented in the export file;
in response to a received response to the prompt match an image file from the directory of the images to the data associated with at least one comment in the user data; and
store the data associated with the at least one comment as metadata in the image file.

10. The at least one non-transitory computer readable medium of claim 9, wherein the instructions further cause the at least one processor to:
parse the export file including the user data associated with the plurality of comments to determine a source social network of the export; and
based on the source social network of the export identify the one of the plurality of comments.

11. The at least one non-transitory computer readable medium of claim 9, wherein the instructions further cause the at least one processor to:
receive a request to open the image file after the data associated with the at least one comment has been stored as metadata with the image file; and
present the image file along with the data from the at least one comment that has been stored as the metadata with the image file.

12. The at least one non-transitory computer readable medium of claim 9, wherein the instructions further cause the at least one processor to:
after storing the data associated with the at least one comment as the metadata in the image file, index the image file and the metadata of the image file in an index.

13. The at least one non-transitory computer readable medium of claim 12, wherein the instructions further cause the at least one processor to:
search for the image file by searching the index.

14. The at least one non-transitory computer readable medium of claim 9, wherein the instructions further cause the at least one processor to:
add the image file along with the metadata of the image file to an archive directory of social network comments that includes comments from multiple social networks.

15. A system, comprising:
at least one non-transitory computer readable medium comprising instructions stored thereon; and
at least one processor configured to execute the instructions to cause the at least one processor to:
receive, by a social network import service, an export file of user data from a social network, the export file comprising a directory of images and a plurality of comments on the social network;
analyze, at the social network import service, the export file to determine that export file includes data from the social network;
prompt a user with a question about whether the user would like the image file from the directory of images matched to a comment of the plurality of comments represented in the export file;
in response to a received response to the prompt, match an image file from the directory of images to the data associated with at least one comment in the user data; and
store the data associated with the at least one comment as metadata in the image file.

16. The system of claim 15, wherein the instructions further cause the at least one processor to:
parse the export file including the user data associated with the plurality of comments to determine a source social network of the export; and
based on the source social network of the export identify the one of the plurality of comments.

17. The system of claim 15, wherein the instructions further cause the at least one processor to:
receive a request to open the image file after the data associated with the at least one comment has been stored as the metadata with the image file; and
present the image file along with the data from the at least one comment that has been stored as the metadata with the image file.

18. The method of claim 1, further comprising restoring an integrity of a post on the social network by matching the image file from the directory to the comment represented in the export file.

19. The at least one non-transitory computer readable medium of claim 9, wherein the instructions further cause the at least one processor to:
restore an integrity of a post on the social network by matching the image file from the directory to the comment represented in the export file.

20. The system of claim 15, wherein the instructions further cause the at least one processor to:
restore an integrity of a post on the social network by matching the image file from the directory to the comment represented in the export file.

* * * * *